Jan. 13, 1953  N. CORDIS  2,625,643
HEATED MILKING APPARATUS
Filed July 25, 1947
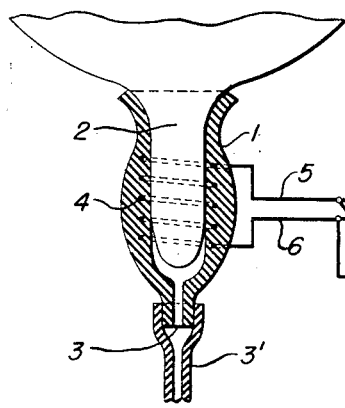
FIG. 1.
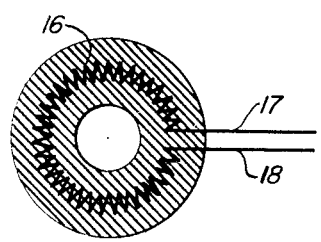
FIG. 3.
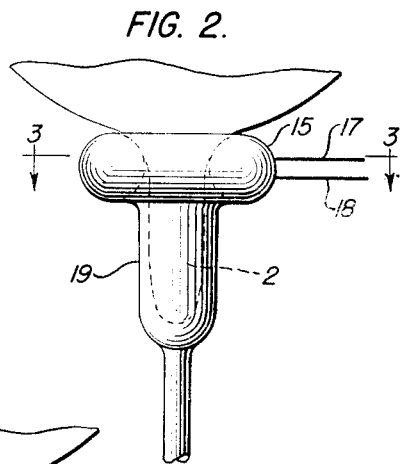
FIG. 2.
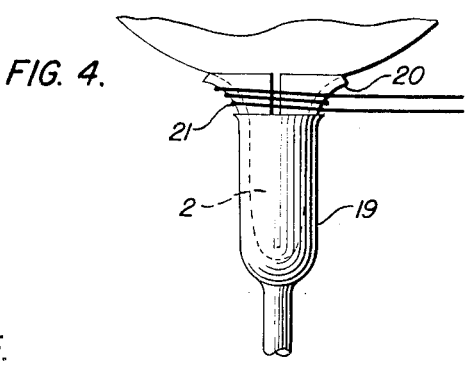
FIG. 4.
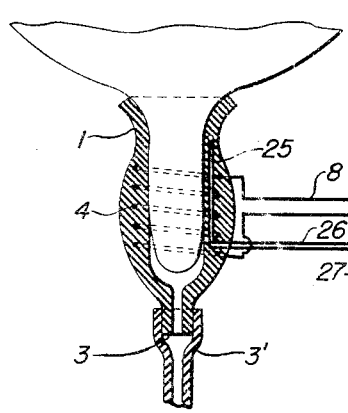
FIG. 5.
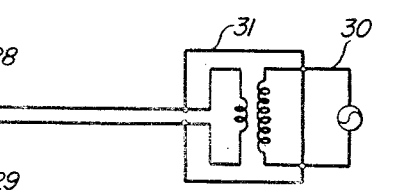
INVENTOR:
Nat Cordis
By: William S. Noelburg, Jr.
ATTORNEY Patented Jan. 13, 1953

2,625,643

UNITED STATES PATENT OFFICE 2,625,643

HEATED MILKING APPARATUS

Nat Cordis, Bassett, Wis.

Application July 25, 1947, Serial No. 763,557

2 Claims. (Cl. 219—46)

This invention relates to milking animals, and more particularly to an improved method and means for increasing the efficiency of removing milk from an animal's udder.

It has long been known that artificial methods of milking animals, as for example cows, are not as efficient as that obtained by their young. Various reasons for this have been propounded, and various apparatus have been devised to reproduce these effects.

It is an object of this invention to provide an improved milking method and apparatus which increases the efficiency of the milking operation by reproducing throughout the milking period to some degree a condition brought about by the mouth of the young which has not heretofore been fully recognized. This condition is the warmth of the mouth which tends to relax the nerves in the animal's udder. It is a further object of this invention to provide apparatus where the warmth may be controlled, and it is still a further object that the degree of warmth be indicated and automatically regulated so as to prevent any possible injury to the cow through the use of my apparatus. It is yet a further object to provide such apparatus as a unitary part of conventional milking apparatus or as an auxiliary to such equipment. Further objects and advantages will be apparent from the following description.

To obtain the aforesaid objects, I have provided an improved method of milking wherein either the udder or the teat, or both, of an animal are continuously warmed or heated during milking. Though many means, as for example, a warm water spray, hot air stream, or heat packs in which, in turn, heat may be generated by hot fluid or electricity, may be used in the practice of my method, I have further provided as my preferred means a device which is adapted to fit, for example, over a cow's teat and in which there is a heating element, which heating element serves to continually warm the teat and to some extent the udder of the cow during the entire milking operation. Preferably, I use improved teat cups on the milking machine in which a heating element is built in. Where, however, milking equipment is already installed and it is not desired to obtain new cups, or in some cases where milking by hand, I have provided an accessory which fits over the cow's teat and functions to warm the cow while the conventional cup is in place or during the hand operation. Though I recognize, as pointed out above, the heating element may be a fluid heat exchange device, such as one using warm water or air, I prefer, for purposes of control and ease of handling, that it be electrical as, for example, an electrical resistance, the current to which may be A. C. or D. C. It may, if desired, be controlled by a rheostat or in my preferred form a thermostatic control for the element may be provided.

My invention will be better understood with reference to the attached drawings forming a part hereof wherein like numerals indicate like parts, and wherein:

Figure 1 is a vertical section of my improved teat cup with associated electrical apparatus.

Figure 2 is a side elevation of a heating attachment for use with a conventional cup.

Figure 3 is a section taken along the line 3—3 of Figure 2.

Figure 4 is an elevation of another embodiment of a heating attachment.

Figure 5 is a vertical section of another embodiment of my improved cup with associated alternating current electrical apparatus.

Referring now to the drawings, a teat cup 1, which is conventionally made of rubber or rubber encased by a metal sleeve, is shown in position on a cow's teat 2. The cup is connected by a hollow nipple 3 to the end of, or may be integral with, a hose 3', which leads to the pump of a milking machine (not shown). Preferably, within the rubber body of the cup is a coil 4 of high resistant electrical wire such as a nickel chromium alloy having suitably insulated leads 5 and 6 connected to a power source, such as battery 7 by ordinary copper wire leads 8 and 9. A rheostat 10 may be inserted in one of the leads, as lead 8, as well as ammeter 11 so that the amount of heat generated in the cup can be regulated by regulating the current flowing through the resistance coil. By suitable calibration, such as experience with one's finger, a safe correlation between the current and the temperature can be obtained. I have found that temperatures of about 100° F. to 120° F. are satisfactory, though in some cases higher temperatures are satisfactory. It is readily apparent that one or more other cups can be connected to a single power source, either in series or in parallel, as diagrammatically represented by cup 12.

Where conventional cups are already in use or milking is done by hand, I may obtain an improvement in the milking by a heating attachment such as a ring 15 of Figs. 2 and 3, in which is molded a high resistance coil 16 having suitable insulated leads 17 and 18 extended therefrom. The ring is preferably made of rubber so as to be adaptable to fit snugly over teats of various sizes and is relatively thin so as to permit the conventional cup 19 to be fitted on the teat beneath the ring. In Fig. 4, I have shown an attachment which comprises a funnel-shaped metal element 20, preferably of high heat conductivity such as copper, about which is wrapped the coil 21 suitably electrically insulated from the element 20. This funnel-shaped metal element is adapted to be fitted over the teat prior to placing the conventional cup 19 in position, and is held in position thereby, preferably by frictionally engaging the top of the cup. In operation the heating element warms up the metal funnel which, because of its heat conductivity, warms a large area of the cow's udder. The metal funnel may be longitudinally split so as to have some degree of expansibility thus to adapt it to cows having various size udders.

The ring 15 or the funnel-shaped attachment 20 can be connected in a circuit similar to that in Fig. 1 or in Fig. 5, hereinafter described, in the same manner as the improved cup shown in Figs. 1 and 5.

In Fig. 5, I have further improved cup 1 by including within the cup a thermocouple 25 which lies preferably adjacent the inner surface of the cup within the heating coil and is suitably insulated from the coil by the body of the cup. This thermocouple has leads 26 and 27 connected to a temperature controller 28. This controller may be of any conventional design, such as an electronic relay familiar to those skilled in the art which will cut-off the current flowing through the heating element 4 when the current in the thermocouple circuit exceeds a predetermined amount as set by the indicator 29. In this embodiment, the power is supplied by a 110 v. alternating circuit, line 30, and the voltage is reduced by transformer 31 to approximately 4 v., which I have found to be a safe value for constant operation. It is, of course, understood that the alternating current power source may be used without the temperature controller and a suitable temperature controller may be used with a direct current source in a manner familiar to those skilled in the electrical art. Also, it is appreciated that where alternating current is used the heat may be generated by inductive or electrostatic effect in addition to simple resistance.

It is appreciated that other advantages and embodiments of my invention will be apparent to those skilled in the art, and no limitations are intended by the above description of various preferred forms, except as are contained in the following claims.

I claim:

1. A heating accessory for use in milking of cows which comprises a solid elastic heat-conducting ring of rubber adapted to yieldingly encircle a teat at its junction with the udder, an extendable electrical high resistance heating unit consisting of a circumferentially expandable nickel-chromium wire coil embedded in heat conducting relation below the surface of said elastic solid ring and having exposed terminals, and flexible electrical leads connected to the terminals of said coil for applying electrical current to said coil, whereby a heating accessory conforming to the lower portion of the udder and encircling the teat near its junction with the udder is provided for supplying heat to the udder during the milking operation.

2. A heating accessory for use in milking of cows which comprises a solid elastic heat-conducting ring of generally circular cross-section and adapted to yieldingly encircle a teat at its junction with the udder, an extendable high resistance heating unit comprising a circumferentially expandible wire coil centrally embedded in said ring, and exposed terminals of said coil consisting of flexible electrical leads for applying electrical heating current to said coil, whereby a heating accessory conforming to the lower portion of the udder and encircling the teat near its junction with the udder is provided for supplying heat to the udder during the milking operation.

NAT CORDIS.

REFERENCES CITED

The following references are of record in the file of this patent:

UNITED STATES PATENTS

| Number | Name | Date |
|---|---|---|
| 673,296 | Siemsgluss et al. | Apr. 30, 1901 |
| 764,592 | Johnson | July 12, 1904 |
| 840,857 | Matcovitch | Jan. 8, 1907 |
| 942,243 | Berberich | Dec. 7, 1909 |
| 948,440 | Berberich | Feb. 8, 1910 |
| 992,072 | Sharples | May 9, 1911 |
| 1,011,574 | Carron | Dec. 12, 1911 |
| 1,142,626 | Remy | June 8, 1915 |
| 1,715,486 | Wolfe et al. | June 4, 1929 |
| 1,739,483 | Hinman | Dec. 10, 1929 |
| 2,154,428 | Andres | Apr. 18, 1939 |
| 2,227,781 | Joy et al. | Jan. 7, 1941 |
| 2,252,423 | Baddour | Aug. 12, 1941 |
| 2,298,298 | Joy et al. | Oct. 13, 1942 |
| 2,346,841 | Henderson | Apr. 18, 1944 |
| 2,441,908 | Schwarzmayr | May 18, 1948 |

FOREIGN PATENTS

| Number | Country | Date |
|---|---|---|
| 419,843 | Great Britain | Nov. 20, 1934 |